(12) United States Patent
Vilenskiy et al.

(10) Patent No.: US 11,070,094 B2
(45) Date of Patent: Jul. 20, 2021

(54) APPARATUS AND METHOD FOR WIRELESS POWER TRANSMISSION

(71) Applicant: Samsung Electronics Co., Ltd., Suwon-si (KR)

(72) Inventors: Artem Rudolfovich Vilenskiy, Moscow (RU); Mikhail Nikolaevich Makurin, Arkhangelsk (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/625,116

(22) PCT Filed: Aug. 3, 2018

(86) PCT No.: PCT/KR2018/008852
§ 371 (c)(1),
(2) Date: Dec. 20, 2019

(87) PCT Pub. No.: WO2019/027290
PCT Pub. Date: Feb. 7, 2019

(65) Prior Publication Data
US 2020/0144865 A1 May 7, 2020

(30) Foreign Application Priority Data

Aug. 4, 2017 (RU) .............................. RU2017127793

(51) Int. Cl.
*H02J 50/23* (2016.01)
*H02J 50/27* (2016.01)

(52) U.S. Cl.
CPC .............. *H02J 50/23* (2016.02); *H02J 50/27* (2016.02)

(58) Field of Classification Search
None
See application file for complete search history.

(56) References Cited

U.S. PATENT DOCUMENTS 5,966,102 A * 10/1999 Runyon ................. H01Q 1/246
343/797
7,400,253 B2 7/2008 Cohen
(Continued)

FOREIGN PATENT DOCUMENTS

JP 2012-217323 A 11/2012
JP 2014-003849 A 1/2014
(Continued)

OTHER PUBLICATIONS

International Search Report dated Dec. 6, 2018, issued in International Patent Application No. PCT/KR2018/008852.
(Continued)

*Primary Examiner* — Jared Fureman
*Assistant Examiner* — Joel Barnett
(74) *Attorney, Agent, or Firm* — Jefferson IP Law, LLP

(57) ABSTRACT

A wireless power transmission method includes: receiving a communication signal from a wireless power receiver; determining, based on the communication signal, phases of polarization channels of a reference antenna array, at which the wireless power receiver receives maximum power; determining, by activating a first antenna array together with the reference antenna array, phases of polarization channels of the first antenna array such that the wireless power receiver receives maximum power; determining, by deactivating the first antenna array and activating a second antenna array together with the reference antenna array, phases of polarization channels of the second antenna array such that the wireless power receiver receives maximum power; and transmitting, to the wireless power receiver, a power signal generated by using the antenna arrays, the phases of which are determined.

14 Claims, 12 Drawing Sheets

(56) References Cited

U.S. PATENT DOCUMENTS

| | | | |
|---|---|---|---|
| 7,639,994 | B2 | 12/2009 | Greene et al. |
| 8,072,380 | B2 | 12/2011 | Crouch |
| 8,854,176 | B2 | 10/2014 | Zeine |
| 9,142,973 | B2 | 9/2015 | Zeine |
| D777,102 | S | 1/2017 | Zeine |
| 9,553,473 | B2 | 1/2017 | Zeine et al. |
| 9,620,996 | B2 | 4/2017 | Zeine et al. |
| 9,654,264 | B2 | 5/2017 | Athley et al. |
| 10,027,168 | B2 | 7/2018 | Leabman |
| 2010/0315045 | A1* | 12/2010 | Zeine ................ H02J 50/402 320/137 |
| 2011/0075763 | A1* | 3/2011 | Shim ................ H04L 27/2032 375/309 |
| 2012/0127034 | A1* | 5/2012 | DiFonzo ............. H01Q 3/2682 342/375 |
| 2013/0225097 | A1* | 8/2013 | Hong ................ H04B 15/00 455/77 |
| 2015/0042526 | A1 | 2/2015 | Zeine |
| 2015/0102681 | A1 | 4/2015 | Leabman et al. |
| 2015/0102764 | A1 | 4/2015 | Leabman et al. |
| 2015/0207542 | A1 | 7/2015 | Zeine |
| 2016/0013685 | A1 | 1/2016 | Zeine |
| 2016/0099601 | A1 | 4/2016 | Leabman et al. |
| 2016/0099610 | A1 | 4/2016 | Leabman et al. |
| 2016/0099614 | A1 | 4/2016 | Leabman et al. |
| 2016/0099757 | A1* | 4/2016 | Leabman ............. H02J 50/23 307/104 |
| 2016/0149315 | A1 | 5/2016 | Elsherbini et al. |
| 2016/0190869 | A1 | 6/2016 | Shao et al. |
| 2016/0248270 | A1 | 8/2016 | Zeine et al. |
| 2016/0254844 | A1* | 9/2016 | Hull ................. H04B 5/0037 340/6.1 |
| 2016/0301129 | A1 | 10/2016 | Ying et al. |
| 2016/0301217 | A1 | 10/2016 | Zeine et al. |
| 2016/0301240 | A1 | 10/2016 | Zeine et al. |
| 2016/0301243 | A1 | 10/2016 | Zeine et al. |
| 2016/0301255 | A1 | 10/2016 | Zeine |
| 2016/0301256 | A1 | 10/2016 | Zeine et al. |
| 2016/0301258 | A1 | 10/2016 | Zeine et al. |
| 2016/0301264 | A1 | 10/2016 | Zeine et al. |
| 2016/0322714 | A1 | 11/2016 | Ying et al. |
| 2016/0359376 | A1 | 12/2016 | Zeine et al. |
| 2016/0359377 | A1 | 12/2016 | Zeine et al. |
| 2016/0359379 | A1 | 12/2016 | Zeine et al. |
| 2016/0359380 | A1 | 12/2016 | Zeine et al. |
| 2016/0365754 | A1 | 12/2016 | Zeine et al. |
| 2017/0005520 | A1 | 1/2017 | Zeine et al. |
| 2017/0005530 | A1 | 1/2017 | Zeine et al. |
| 2017/0005531 | A1 | 1/2017 | Zeine et al. |
| 2017/0005533 | A1 | 1/2017 | Zeine et al. |
| 2017/0033470 | A1 | 2/2017 | Petersson et al. |
| 2017/0041046 | A1 | 2/2017 | Shylendra et al. |
| 2017/0047977 | A1 | 2/2017 | Kim et al. |
| 2017/0063156 | A1 | 3/2017 | Williams et al. |
| 2017/0065828 | A1 | 3/2017 | Poon et al. |
| 2017/0069969 | A1 | 3/2017 | Black et al. |
| 2017/0069973 | A1 | 3/2017 | Black et al. |
| 2017/0085129 | A1 | 3/2017 | Zeine et al. |
| 2017/0104374 | A1 | 4/2017 | Zeine et al. |
| 2017/0110909 | A1 | 4/2017 | Zeine et al. |
| 2017/0110910 | A1 | 4/2017 | Zeine et al. |
| 2017/0117754 | A1 | 4/2017 | Noori et al. |
| 2017/0134686 | A9 | 5/2017 | Leabman et al. |
| 2017/0149294 | A1 | 5/2017 | Wight et al. |
| 2017/0366045 | A1 | 12/2017 | Bilbrey et al. |
| 2018/0048178 | A1* | 2/2018 | Leabman ................ H04B 1/04 |

FOREIGN PATENT DOCUMENTS

| | | |
|---|---|---|
| KR | 10-2013-0099181 A | 9/2013 |
| KR | 10-1372472 B1 | 3/2014 |
| KR | 10-2017-0036628 A | 4/2017 |
| RU | 2596613 C2 | 9/2016 |
| RU | 2604634 C2 | 12/2016 |
| WO | 2016/134184 A1 | 8/2016 |
| WO | 2016/164321 A1 | 10/2016 |
| WO | 2016/164772 A1 | 10/2016 |
| WO | 2016/164785 A1 | 10/2016 |
| WO | 2016/164790 A1 | 10/2016 |
| WO | 2016/164851 A1 | 10/2016 |
| WO | 2016/200908 A1 | 12/2016 |
| WO | 2016/200911 A1 | 12/2016 |
| WO | 2017/004335 A1 | 1/2017 |
| WO | 2017/004352 A1 | 1/2017 |
| WO | 2017/035316 A1 | 3/2017 |
| WO | 2017/062915 A1 | 4/2017 |
| WO | 2017/066629 A1 | 4/2017 |

OTHER PUBLICATIONS

Russian Search Report dated Apr. 9, 2018, issued in Russian Patent Application No. 2017127793.

Russian Decision on Grant dataed Apr. 16, 2018, issued in Russian Patent Application No. 2017127793.

Extended European Search Report dated Feb. 19, 2020, issued in European Patent Application No. 18842263.8-1202.

* cited by examiner

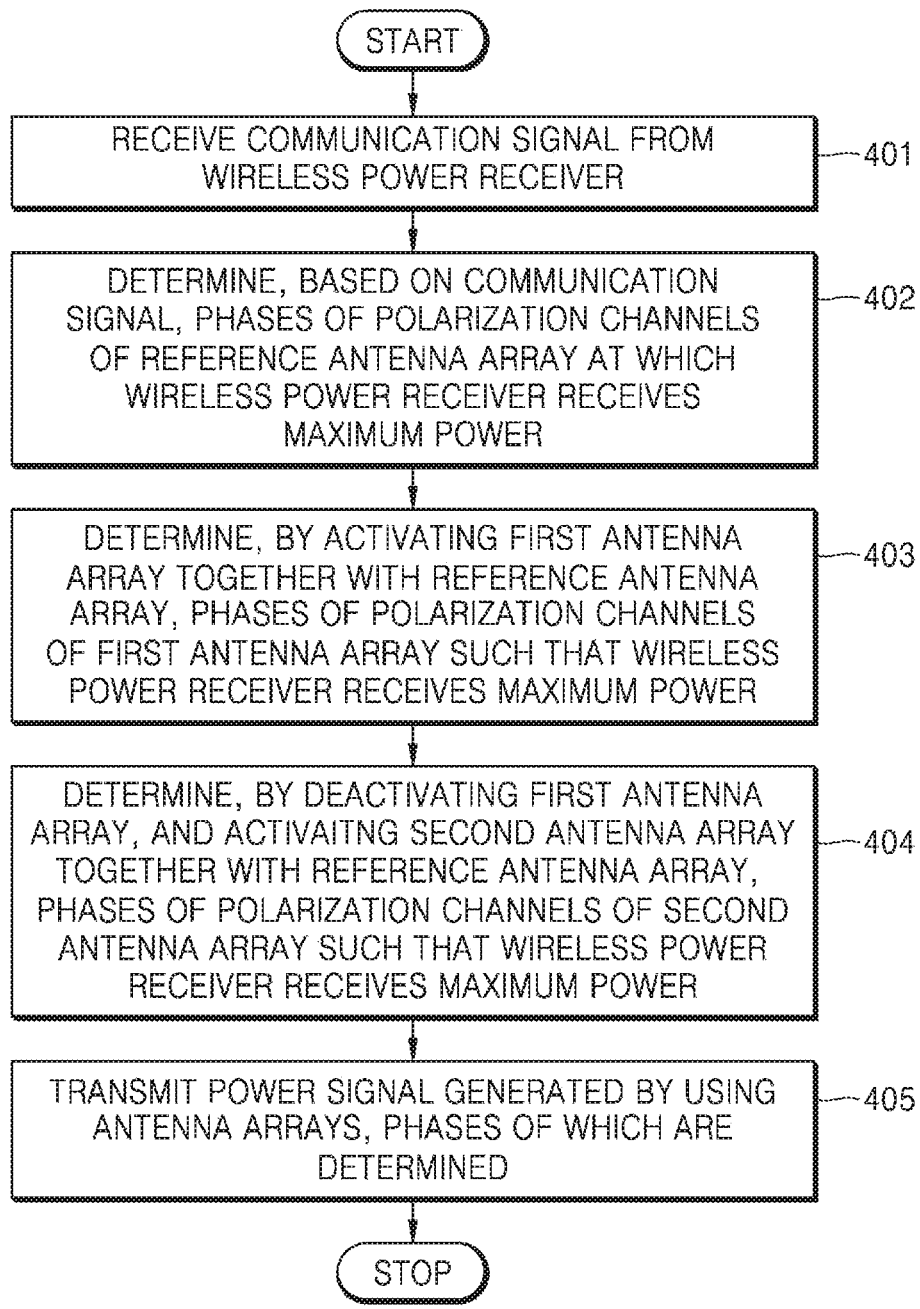

APPARATUS AND METHOD FOR WIRELESS POWER TRANSMISSION

TECHNICAL FIELD

The disclosure relates to a method and an apparatus for wirelessly transmitting power in a multi-path environment, and more particularly, to a method and an apparatus for charging a plurality of devices by wirelessly transmitting power in a multi-path environment.

BACKGROUND ART

Wireless power transmission, in which electric energy is wirelessly transmitted to a receiver, has been developed to transmit electric energy by using an electric motor or a transformer based on electromagnetic induction or by using radio waves or electromagnetic waves such as lasers. Current wireless energy transmission methods include remote transmission techniques using magnetic induction, magnetic resonance, and short wavelength wireless frequencies.

Wireless power transmission techniques using short wavelength wireless frequencies mainly implement a method whereby a transmitter three-dimensionally receives an electrical signal provided from a receiver and transmits the electrical signal through beamforming after specifying a location of the receiver. However, when the receiver is in motion or there is an obstacle in a straight line, the efficiency of power transmission may be decreased. Thus, a method for overcoming this has been continually studied.

DESCRIPTION OF EMBODIMENTS

Technical Problem

Provided are a wireless power transmitter and a wireless power transmission method for increasing the efficiency of wireless power transmission by adjusting phases of polarization channels of an antenna array with respect to a wireless charge receiver.

Solution to Problem

According to a first embodiment, a wireless power transmission method includes: receiving a communication signal from a wireless power receiver; determining, based on the communication signal, phases of polarization channels of a reference antenna array, at which the wireless power receiver receives maximum power; determining, by activating a first antenna array together with the reference antenna array, phases of polarization channels of the first antenna array such that the wireless power receiver receives maximum power; determining, by deactivating the first antenna array and activating a second antenna array together with the reference antenna array, phases of polarization channels of the second antenna array such that the wireless power receiver receives maximum power; and transmitting, to the wireless power receiver, a power signal generated by using the antenna arrays, the phases of which are determined.

According to a second embodiment, a wireless power transmitter includes: an antenna portion including a plurality of antenna arrays including two separate polarization channels for transmitting a wireless power signal; a processor; and a memory, wherein the processor is configured to: determine, after receiving a communication signal from a wireless power receiver, phases of polarization channels of a reference antenna array, at which the wireless power receiver receives maximum power, based on the communication signal; determine, by activating a first antenna array together with the reference antenna array, phases of polarization channels of the first antenna array such that the wireless power receiver receives maximum power; determine, by deactivating the first antenna array and activating a second antenna array together with the reference antenna array, phases of polarization channels of the second antenna array such that the wireless power receiver receives maximum power; and transmit, to the wireless power receiver, a power signal generated by using the antenna arrays, the phases of which are determined.

According to a third embodiment, a computer program product includes a recording medium storing a computer program to: determine, after receiving a communication signal from a wireless power receiver, phases of polarization channels of a reference antenna array, at which the wireless power receiver receives maximum power, based on the communication signal; determine, by activating a first antenna array together with the reference antenna array, phases of polarization channels of the first antenna array such that the wireless power receiver receives maximum power; determine, by deactivating the first antenna array and activating a second antenna array together with the reference antenna array, phases of polarization channels of the second antenna array such that the wireless power receiver receives maximum power; and transmit, to the wireless power receiver, a power signal generated by using the antenna arrays, the phases of which are determined.

BRIEF DESCRIPTION OF DRAWINGS

FIG. 4 is a flowchart for describing a wireless power transmission method according to an embodiment.

MODE OF DISCLOSURE

Figure 1:
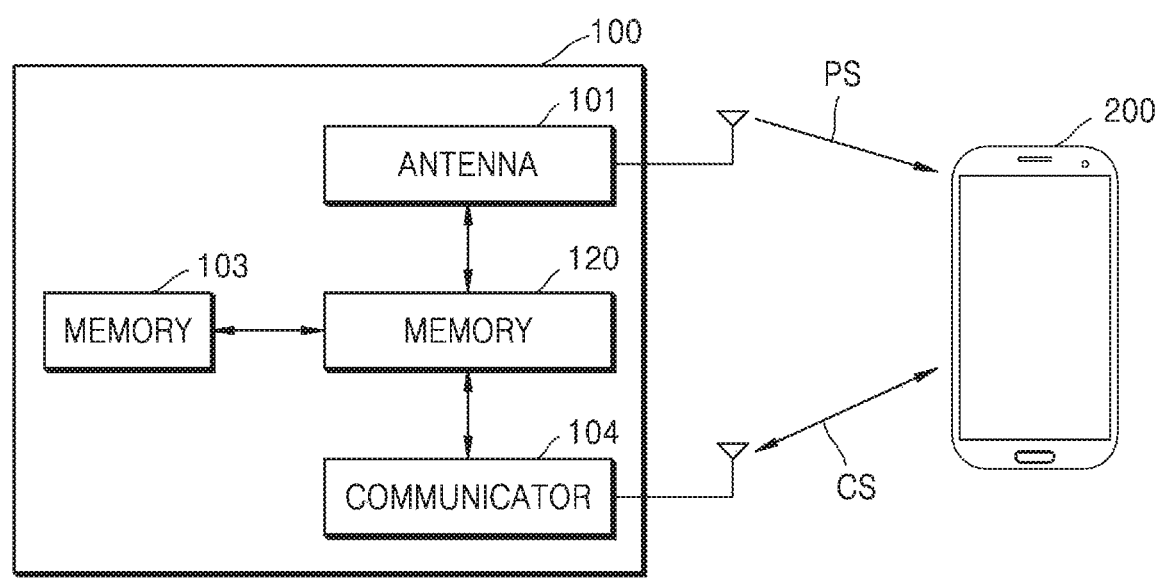
FIG. 1 is a view for describing a wireless power system according to an embodiment.

Hereinafter, embodiments of the disclosure will be described in detail with reference to the accompanying drawings to fully convey the scope of the disclosure to one of ordinary skill in the art. The disclosure may, however, be embodied in different forms and should not be construed as limited to the embodiments set forth herein. Also, parts in the drawings unrelated to the detailed description are omitted to ensure clarity of the disclosure, and like reference numerals in the drawings denote like elements throughout the specification.

It will be further understood that the terms "comprises," "comprising," "includes" and/or "including," when used herein, do not necessarily indicate all of stated features, integers, steps, operations, elements, and/or components described in the specification and may preclude some of the stated features, the integers, steps, operations, elements, and/or components. Also, the terms do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another.

It will be understood that when an element is referred to as being "connected" or "coupled" to another element, it can be "directly connected" or "coupled" to the other element or "electrically connected" or "electrically coupled" to the other element with intervening elements therebetween. It will be further understood that the terms "comprises" and/or "comprising" used herein do not preclude the presence or addition of one or more other features or components, unless there are specific descriptions contrary thereto.

A "polarization wave" denotes a plane of vibration of electromagnetic waves that is defined according to current or voltage distribution on an antenna. When an electromagnetic field component of a progressing plane wave does not change its direction according to a location and a lapse of time, the progressing plane wave may be referred to as a straight line polarization wave. Also, a wave when an electromagnetic field is vertically polarized with respect to the ground may be referred to as a vertical polarization wave and a wave when the electric field is horizontally polarized with respect to the ground may be referred to as a horizontal polarization wave. Also, a circular polarization wave and an oval polarization wave may be formed when the vertical polarization wave and the horizontal polarization wave having different phases from each other are combined.

"A polarization wave channel" may denote a set of wireless devices included in an integral system for generating or controlling a signal on an antenna array to radiate electromagnetic waves (for example, microwaves) having polarization waves.

FIG. 1 is a view for describing a wireless power system according to an embodiment.

According to an embodiment, the wireless power system may include a wireless power transmitter 100 and a wireless power receiver 200.

The efficiency of wireless power transmission may be dependent on sizes of a power receiver RX and a power transmitter TX and on a distance between the receiver receiving power and the transmitter transmitting power wirelessly. Microwaves that are transmitted may significantly be diverged as the distance between the transmitter and the receiver is increased. A divergence rate of the microwaves may be defined by a transmitting aperture size and a relationship between a distance and an operating wavelength.

The wireless power transmitter 100 and the wireless power receiver 200 according to an embodiment may include at least one of a smartphone, a tablet personal computer (PC), a mobile telephone, a video telephone, an electronic book reader, a desktop PC, a laptop PC, a netbook computer, a workstation, a server, a personal digital assistant (PDA), a portable multimedia player (PMP), an MP3 player, a medical device, a camera, or a wearable device. The wearable device may include at least one of an accessory type (for example, a watch, a ring, a bracelet, an anklet, a necklace, a pair of glasses, contact lenses, or a head mounted-device (HMD)), a fabric or clothing-integral type (for example, electronic clothing), a body-integral type (for example, a skin pad), or a bio-implantable circuit. In some embodiments, the wireless power transmitter or an electronic device may include, for example, at least one of a television, a digital video disk (DVD) player, an audio player, a refrigerator, an air-conditioner, a cleaner, an oven, a microwave, a laundry machine, an air cleaner, a setup box, a home automation control panel, a security control panel, a media box, a game console, an electronic dictionary, an electronic key, a camcorder, or an electronic frame.

In other embodiments, the wireless power transmitter and the wireless power receiver may include at least one of various medical devices (for example, various portable medical measuring devices (a blood sugar measurer, a heart rate measurer, a blood pressure measurer, a body temperature measurer, etc.), magnetic resonance angiography (MRA), magnetic resonance imaging (MRI), computed tomography (CT), a capturing machine, an ultrasonic device, or the like), a navigation device, a global navigation satellite system (GNSS), an event data recorder (EDR), a flight data recorder (FDR), a vehicle infortainment device, vessel electronic equipment (for example, a vessel navigation device, a gyro compass, etc.), avionics, a security device, a vehicle head unit, an industrial or home robot, a drone, an automatic teller machine (ATM) of a financial institute, a point of sales (POS) terminal of a store, or an Internet of things (IoT) devices (for example, a bulb, various sensors, a sprinkler device, a fire alarm device, a temperature adjustment device, a street light, a toaster, a health machine, a warm water tank, a heater, a boiler, etc.). In some embodiments, the wireless power transmitter or the electronic device may include at least one of furniture, a part of a building/structure or a vehicle, an electronic board, an electronic signature receiving device, a projector, or various measuring devices (for example, a water supply, electricity, gas, or electro wave measuring device, etc.). According to various embodiments, the wireless power transmitter or the electronic device may be flexible or may be a combination of two or more from among the described various devices. The wireless power transmitter or the electronic device according to embodiments of this specification is not limited to the described devices. In this specification, the term "user" may refer to a person using an electronic device or a device (for example, an artificial intelligence (AI) electronic device) using the wireless power transmitter 100 and the wireless power receiver 200.

According to an embodiment, the wireless power transmission system may be used for wireless power supply for a device having no integrated batteries, for example, a radio frequency identification (RFID) tag, a sensor, etc.

Also, according to an embodiment, the wireless power transmission system may transmit power to a wireless power receiver randomly spaced apart from the wireless power transmission system by using an optimal method. The wireless power transmitter may concentrate radiation to the wireless power receiver through phase adjustment of a polarization channel in all environments regardless of whether or not there is an obstacle between the wireless power transmitter and the wireless power receiver. Thus, optimal multi-focal distribution of the wireless power transmitter is formed, and thus, the total antenna arrays of the wireless power transmitter may be used, in order to transmit power to a plurality of wireless power receivers with maximum efficiency.

According to an embodiment, the wireless power transmission system may transmit power even when the wireless power receiver is in motion. The wireless power transmitter may determine that the wireless power receiver is in motion while the wireless power transmitter wirelessly transmits power, based on a change in information about power received from the wireless power receiver through a feedback channel.

Also, the wireless power receiver may identify an operation of the wireless power receiver by using various integral sensors (an accelerometer, a GPS, a gyroscope, a magnetic sensor, etc.) and transmit information about the motion to the wireless power transmitter through a feedback channel. In this case, the wireless power transmitter may repeatedly perform the process described above to search for a new optimum value of a polarization channel of the antenna arrays.

The wireless power transmission according to an embodiment may use microwave radiation. However, alternatively, a random wavelength range may be used, and with respect to this, controlled focusing of the radiation and electromagnetic waves may be possible. For example, short waves, sub-millimeter (terahertz) radiation, etc. may be alternatively used.

According to an embodiment, an antenna portion 101 may transmit a power signal to the wireless power receiver 200. According to an embodiment, the antenna portion 101 may include a plurality of antenna arrays, each of which is capable of generating a power signal. For example, the antenna portion 101 may include at least one multiple polarization antenna. For example, the multiple polarization antenna may include a plurality of unitary polarization antennas.

According to an embodiment, a controller 102 may control general operations of the wireless power transmitter 100. According to an embodiment, the controller 102 may include a microprocessor or various analog-digital logics. According to an embodiment, the controller 102 may modulate each of a phase and an amplitude of a power signal PS. The controller 102 may provide a phase amplitude control algorithm and calculate phase modulation and amplitude modulation of the power signal PS to increase the wireless power transmission efficiency.

According to an embodiment, a memory 103 may store various commands for controlling the wireless power transmitter 100. Also, the memory 103 may store information about a phase of the antenna portion 101, the phase being adjusted for efficient wireless power transmission.

According to an embodiment, a communicator 104 may receive a communication signal CS from the wireless power receiver 200 and transmit the received communication signal CS to the controller 102. For example, the communication signal CS may include a Bluetooth signal, a Wi-fi signal, a Zigbee signal, etc. For example, the communication signal CS may include a signal including information (for example, an amplitude, an intensity, and a phase) about the power signal PS received by the wireless power receiver 200. For example, the communication signal CS may include a wireless signal including information (a magnitude of transmitted power and a charge rate) about a charge state, etc. of the wireless power receiver 200.

According to an embodiment, the communicator 104 may receive the communication signal CS containing information corresponding to start and end points of transmission of the power signal PS, from the wireless power receiver 200. For example, when the wireless power receiver 200 transmits the communication signal CS requesting transmission of the power signal PS to the communicator 104, the communicator 104 may transmit the communication signal CS to the controller 102. Accordingly, the controller 102 may control each component to be in a ready state for transmission of the power signal PS. For example, when the wireless power receiver 200 transmits the communication signal CS requesting ending of transmission of the power signal PS to the communicator 104, the communicator 104 may transmit the communication signal CS to the controller 102. Accordingly, the controller 102 may control each component to end the transmission of the power signal PS.

The communicator 104 may transmit the communication signal CS. For example, the communicator 104 may transmit the communication signal CS including various information related to a state of the wireless power transmitter 100, to the wireless power receiver 200.

The controller 102 may modify or correct a phase amplitude control algorithm with reference to the communication signal CS. For example, when the charging of the wireless power receiver 200 is completed, the controller 102 may stop power transmission of the wireless power transmitter 100. For example, when a magnitude of power of at least one power signal received by the wireless power receiver 200 is equal to or less than a predetermined value, the phase amplitude control algorithm may be modified or an amplification rate of the amplitude may be adjusted. For example, the wireless power transmitter 100 may form a feedback system with respect to the communication signal CS received from the wireless power receiver 200. The wireless power transmitter 100 according to the present embodiment may, in real time, modify the phase amplitude control algorithm and fine-tune the amplification rate of the amplitude to increase the efficiency of power transmission.

According to an embodiment, the communication signal CS may refer to a signal transmitted by the wireless power receiver 200 to enable power transmission between the wireless power receiver 200 and the wireless power transmitter 100. The wireless power transmitter 100 may transmit the power signal PS corresponding to the communication signal CS, and thus, for transmission of the power signal PS, synchronization of the two devices based on the communication signal CS may have to precede. The communication signal CS may be transmitted through all possible paths between the wireless power receiver 200 and the wireless power transmitter 100. Although it is linearly illustrated in the drawings for convenience of explanation, it is not that the communication signal CS is necessarily transmitted along a straight line connecting the wireless power receiver 200 and the wireless power transmitter 100. For example, the communication signal CS may be directly transmitted along a line of sight between the wireless power transmitter 100 and the wireless power receiver 200 or may be indirectly transmitted along a none line of sight through reflection, diffraction, and refraction.

Figure 2:
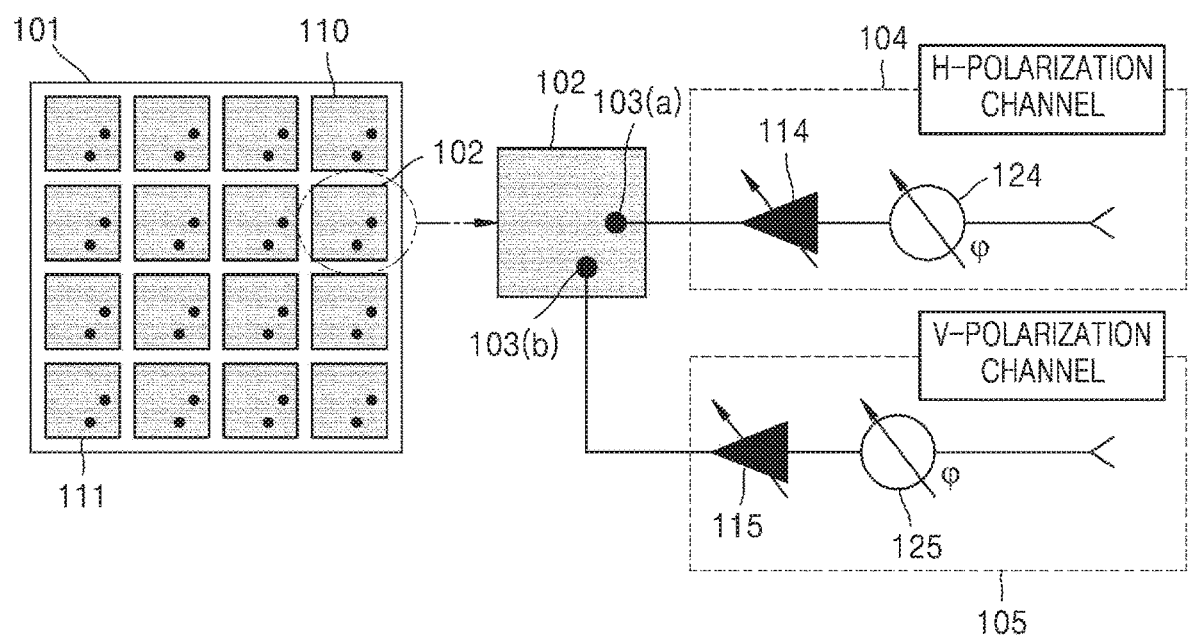
FIG. 2 is a view for describing a structure of a wireless power transmitter according to an embodiment.

FIG. 2 is a view for describing a structure of a wireless power transmitter according to an embodiment.

According to an embodiment, a wireless power transmitter 101 may include a plurality of antenna arrays. For example, the wireless power transmitter 101 may include M antenna arrays. Each of the plurality of antenna arrays included in the wireless power transmitter 101 may include a dual-polarization channel.

According to an embodiment, the antenna array 102 may include a radiation strip antenna (patch antenna). According to an embodiment, the antenna array 102 may include a dipole antenna, a monopole antenna, a waveguide slot, and other print radiation devices, but is not limited thereto. For example, the antenna array 102 may include any kind of antenna that may generate radio frequency (RF) waves. As illustrated in FIG. 2, the antenna array 102 included in the wireless power transmitter 101 may include two feeding points. For example, the antenna array 102 may include an H-polarization feeding point 103 (a) and a V-polarization feeding point 103 (b). According to an embodiment, the H-polarization feeding point 103 (a) may be coupled to a horizontal linear polarization channel (hereinafter, an H-channel 104) and the V-polarization feeding point 103 (b) may be coupled to a vertical linear polarization channel (hereinafter, a V-channel 105).

According to an embodiment, the H-channel 104 may include an H-polarization phase converter 114 and an H-polarization amplitude controller 124. Alternatively, the H-channel 104 may include a fixed gain amplifier including an attenuator, in addition to the phase converter 114.

According to an embodiment, the V-channel 105 may include a V-polarization phase converter 115 and an H-polarization amplitude controller 125. Alternatively, the V-channel 105 may include a fixed gain amplifier including an attenuator, in addition to the V-polarization phase converter 115.

According to an embodiment, the phase converter may include any device capable of modifying and outputting a phase of an electrical signal, and may include, for example, HMC642 or HMC 1113. According to an embodiment, the amplifier may adjust an amplitude of an electrical signal, and may include, for example, a gain block amplifier (GBA). Here, adjusting a delay of a signal may denote adjusting a time point at which oscillation from a patch antenna starts, and this may also denote adjusting a phase of a signal.

Figure 3A:
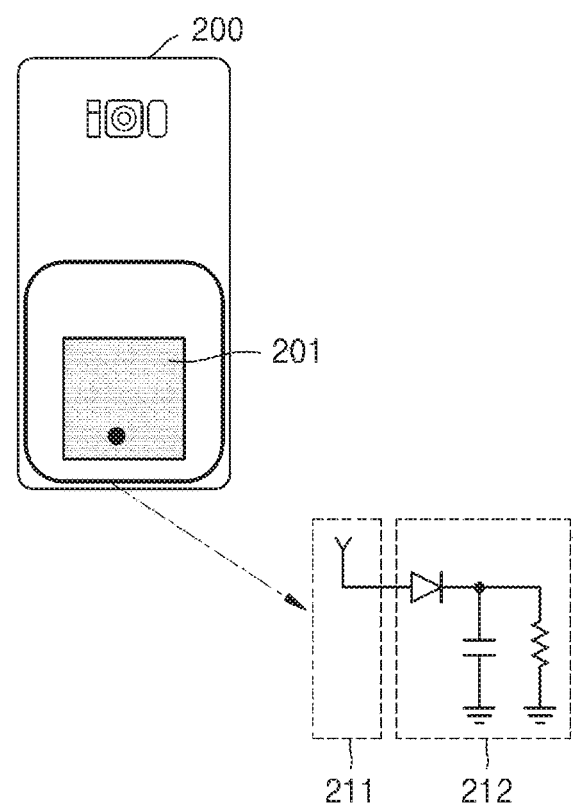
FIG. 3A is a view for describing a structure of a wireless power receiver according to an embodiment.

FIG. 3A is a view for describing a structure of a wireless power receiver RX according to an embodiment.

According to an embodiment, the wireless power receiver 200 may include a receiving rectenna 201 including one polarization channel directly connected to a microwave signal rectifier. According to an embodiment, the term "rectenna" is a portmanteau of the terms "rectifier" and "antenna," and may be a device configured to directly convert RF energy into direct current power and generate direct current electrical energy by rectifying microwaves received through an antenna.

According to an embodiment, the receiving rectenna 201 of the wireless power receiver 200 may include an antenna 211 and a rectifier 212. According to an embodiment, the rectifier 212 may convert a microwave signal received by the antenna 211 into a direct current (DC) voltage signal supplied to a battery of the wireless power receiver 200.

According to an embodiment, the antenna 211 may include a circular polarization channel or a circular polarization rectangular patch antenna. However, the antenna 211 may include other appropriate types of antennas.

According to an embodiment, the receiving rectenna 201 may require only one polarization channel. That is, additional circuits, such as a phase shifter, a phase detector, a pilot signal generator, a power combiner, etc., are not required. Thus, the receiving rectenna 201 may have a very simple structure and may be integrated into all previous mobile devices.

According to an embodiment, the power received by the receiving rectenna 201 may be measured through an output of the receiving rectenna 201 and information about the power output from the receiving rectenna 201 may be transmitted to the wireless power transmitter 100 through a feedback channel (for example, Bluetooth, Wi-fi, etc.).

According to an embodiment, power generated through the output of the receiving rectenna 201 may be transmitted to charge a battery of the wireless power receiver 200.

Figure 3B:
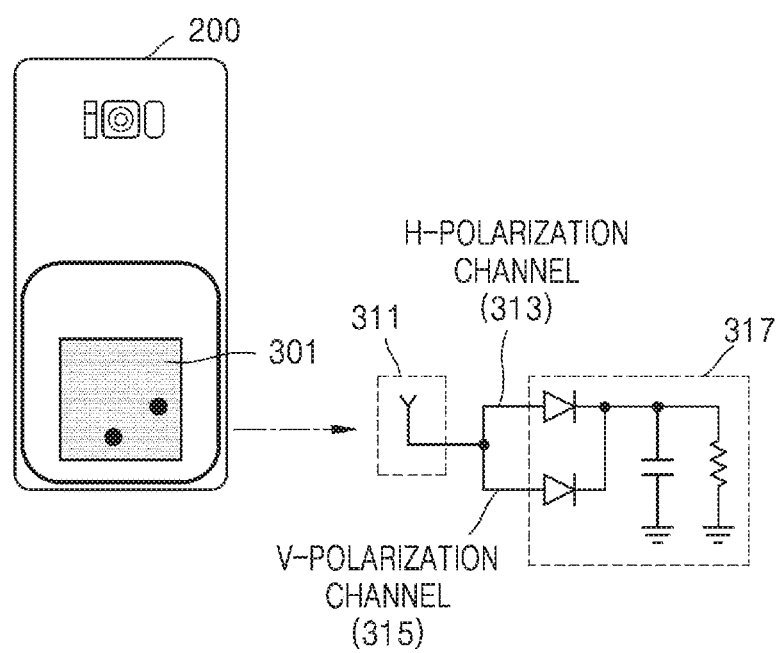
FIG. 3B is a view for describing a structure of a wireless power receiver according to another embodiment.

FIG. 3B is a view for describing a structure of the wireless power receiver according to another embodiment.

According to an embodiment, the wireless power receiver 200 may include a receiving rectenna 301 including polarization channels connected to two rectifiers 317, respectively, which are combined in a single DC load. Here, the polarization channels may include a linear polarization channel or an annular polarization channel.

According to an embodiment, the receiving rectenna 301 may include a dual polarization antenna 311 and the dual polarization antenna 311 may be connected to an H-polarization channel 313 and a V-polarization channel 315.

According to an embodiment, the wireless power transmitter 100 and the wireless power receiver 200 may have a random combination of polarization channels. For example, when the wireless power receiver 200 has two linear polarization channels, the wireless power transmitter 100 may have two linear polarization channels or two circular polarization channels.

FIG. 4 is a flowchart for describing a wireless power transmission method according to an embodiment.

In block 401, the wireless power transmitter 100 may receive a communication signal from a wireless power receiver.

According to an embodiment, the wireless power transmitter 100 may detect at least one wireless current receiver. According to an embodiment, the wireless power transmitter 100 may receive a feedback signal from the at least one wireless current receiver. The feedback signal may include, for example, any one of Bluetooth, Wi-fi, and beacon signals. According to an embodiment, the wireless power transmitter 100 may detect power output which is output from the at least one wireless current receiver, based on the feedback signal received from the at least one wireless current receiver.

For example, the feedback signal may be directly transmitted along a line of sight between the wireless power transmitter 100 and the at least one wireless power receiver or may be indirectly transmitted along a none line of sight through reflection, diffraction, and refraction.

In block 402, the wireless power transmitter 100 may determine, based on a communication signal, phases of polarization channels of a reference antenna array, at which power received by a wireless power receiver has a maximum value.

According to an embodiment, the reference antenna array may be selected from a plurality of antenna arrays included in the wireless power transmitter 100. According to an embodiment, the reference antenna array may be determined based on a predetermined reference or may be randomly selected. According to an embodiment, the reference antenna array may be any one of the plurality of antenna arrays of the wireless power transmitter 100, and thus, a structure of the reference antenna array described hereinafter may be the same as structures of the other plurality of antenna arrays.

According to an embodiment, the reference antenna array may include two separate polarization channels. For example, the reference antenna array may include a horizontal linear polarization channel (an H-channel) and a vertical linear polarization channel (a V-channel).

According to an embodiment, while the reference antenna array is activated, other antenna arrays included in the wireless power transmitter 100 may be deactivated. According to another embodiment, while the reference antenna array is activated, other antenna arrays may operate in a minimum output condition for operation.

According to an embodiment, the reference antenna array may operate at maximum power, and thus, may radiate a power signal, while the other remaining antenna arrays are deactivated. According to an embodiment, a feedback signal may be received from at least one wireless power receiver receiving power transmitted from the reference antenna array. Hereinafter, operations of the reference antenna array and the wireless power receiver will be described.

According to an embodiment, a reference feedback signal may include information about a power output from the wireless power receiver receiving a power signal radiated from the reference antenna array.

According to an embodiment, when power is supplied to the two polarization channels of the reference antenna array, phases of the polarization channels may be changed by a phase converter included in the reference antenna array. According to an embodiment, the reference antenna array may adjust the phases of the polarization channels based on the reference feedback signal, in order to find values of the phases of the polarization channels at which the power signal received from the wireless power receiver has a maximum value. For example, the reference antenna array may generate a power signal by changing a relative phase between the two polarization channels and may radiate the generated power signal. Also, the reference antenna array may monitor a magnitude of the power signal received by the wireless power receiver, based on the reference feedback signal output by the wireless power receiver receiving the radiated power signal. According to an embodiment, the reference antenna array may determine a phase of the polarization channels, at which the monitored magnitude of the power signal has the maximum value.

According to an embodiment, the wireless power transmitter 100 may operate the reference antenna array based on the determined phase of the polarization channels. That is, the reference antenna array may output a power signal based on the determined phase.

In block 403, the wireless power transmitter 100 may activate a first antenna array together with the reference antenna array, in order to determine a phase of polarization channels of the first antenna array such that power received by the wireless power receiver has a maximum value.

According to an embodiment, the wireless power transmitter 100 may activate any one antenna array from among other deactivated antenna arrays, while the reference antenna array is operated. That is, the wireless power transmitter 100 may activate the first antenna array having a variable phase, from among the M antenna arrays, together with the reference antenna array operating at a fixed phase. The wireless power transmitter 100 may detect a first feedback signal output from the wireless power receiver while changing the phases of the first antenna array. According to an embodiment, the wireless power transmitter 100 may determine, based on the first feedback signal, a first phase of the first antenna array, at which power received by the wireless power receiver has a maximum value.

In block 404, the wireless power transmitter 100 may determine a phase of polarization channels of a second antenna array such that power received by the wireless power receiver has a maximum value, by deactivating the first antenna array and activating the second antenna array along with the reference antenna array.

According to an embodiment, when the first phase is determined, the wireless power transmitter 100 may deactivate the first antenna array. Next, the wireless power transmitter 100 may activate the second antenna array having a variable phase, from among the M antenna arrays. Here, the wireless power transmitter 100 may activate the second antenna array together with the reference antenna array.

According to an embodiment, a second phase of the second antenna array may be determined by using the same method as the method of determining the first phase of the first antenna array.

Also, the wireless power transmitter 100 may sequentially determine proper phases of the remaining antenna arrays by using the same method. That is, the wireless power transmitter 100 may determine phases of the M antenna arrays, respectively, at which maximum power may be provided to the wireless power receiver.

In block 405, the wireless power transmitter 100 may transmit, to the wireless power receiver, a power signal generated by using the antenna arrays, the phases of which are determined.

According to an embodiment, when the wireless power receiver receiving the power signal radiated from the wireless power transmitter 100 includes two or more wireless power receivers, the phases of the M antenna arrays may be sequentially determined with respect to the plurality of wireless power receivers.

According to an embodiment, the wireless power transmitter 100 may transmit a wireless power signal to one or more wireless power receivers by using the phases of the M antenna arrays.

According to an embodiment, the wireless power transmitter 100 may obtain a complex amplitude Ai of the M antenna arrays by using Equation 1.

$$A_i^{1,2} = \sum_{k=1}^{N_{RX}} \exp(j\varphi_{ik}^{1,2})  \qquad \text{Equation 1}$$

Here, $\varphi_{ik}^{1,2}$ denotes any one of optimum phases of two polarization channels of an $i^{th}$ antenna array from among the M antenna arrays with respect to a $k^{th}$ wireless power receiver and i may have a value equal to or greater than 1 and equal to or less than M. Also, $N_{RX}$ may denote the number of the one or more wireless power receivers and j may be an imaginary number.

According to an embodiment, when there is one wireless power receiver, a complex amplitude of the polarization channels of the M antenna arrays may be obtained by using Equation 2.

$$A_i^{V,H} = \exp(j\varphi_i^{V,H})  \qquad \text{Equation 2}$$

Here, $\varphi_{ik}^{1,2}$ denotes any one of optimum phases of two polarization channels of an $i^{th}$ antenna array from among the M antenna arrays and i may have a value equal to or greater than 1 and equal to or less than M.

In summary, the wireless power transmitter 100 may transmit an optimum power signal to the wireless power receiver regardless of whether there is an obstacle or not, by setting an optimum phase with respect to each of the M antenna arrays with respect to the wireless power receiver.

According to an embodiment, a method of adjusting the phase of the polarization channels of each of the M antenna arrays may include a conjugate gradient method or a random optimum solution search method, but it is not limited thereto.

According to an embodiment, the wireless power transmitter 100 may simultaneously obtain the phases of the polarization channels with respect to the M antenna arrays. According to an embodiment, when a certain phase of the wireless power transmitter 100 corresponds to $(\Delta\Phi)=11.25°$, a relative phase of the polarization channel of the antenna array may be linearly changed to $0, \Delta\Phi, 2\Delta\Phi, 3\Delta\Phi, \ldots 360°$. Simultaneously, the wireless power transmitter 100 may receive data about a power output from the wireless power receiver through a feedback signal from the wireless power receiver. When the phase adjustment is completed within a range of 0° to 360°, the wireless power transmitter 100 may determine the optimum phase of the polarization channels of the antenna array, at which power received by the wireless power receiver has a maximum value.

The described method may be usefully used when there are a plurality of wireless power receivers. According to an embodiment, a time required for charging a plurality of wireless power receivers may be estimated by using Equation 3 below.

$$T_0 = N_{RX} N_{opt} \Delta t \quad \text{Equation 3}$$

$$T_1 = \frac{360°}{\Delta\varphi} \Delta t$$

Here, $\Delta t$ may denote a time taken for unitary phase conversion switching and $N_{opt}$ may denote the average number of times of phase conversion for phase adjustment for selecting an optimum phase with respect to each of the wireless power receivers. Also, $N_{RX}$ may denote the number of wireless power receivers.

According to an embodiment, when the number of wireless power receivers becomes greater than a predetermined number, the time taken for selecting the optimum phase may be reduced.

Figure 5:
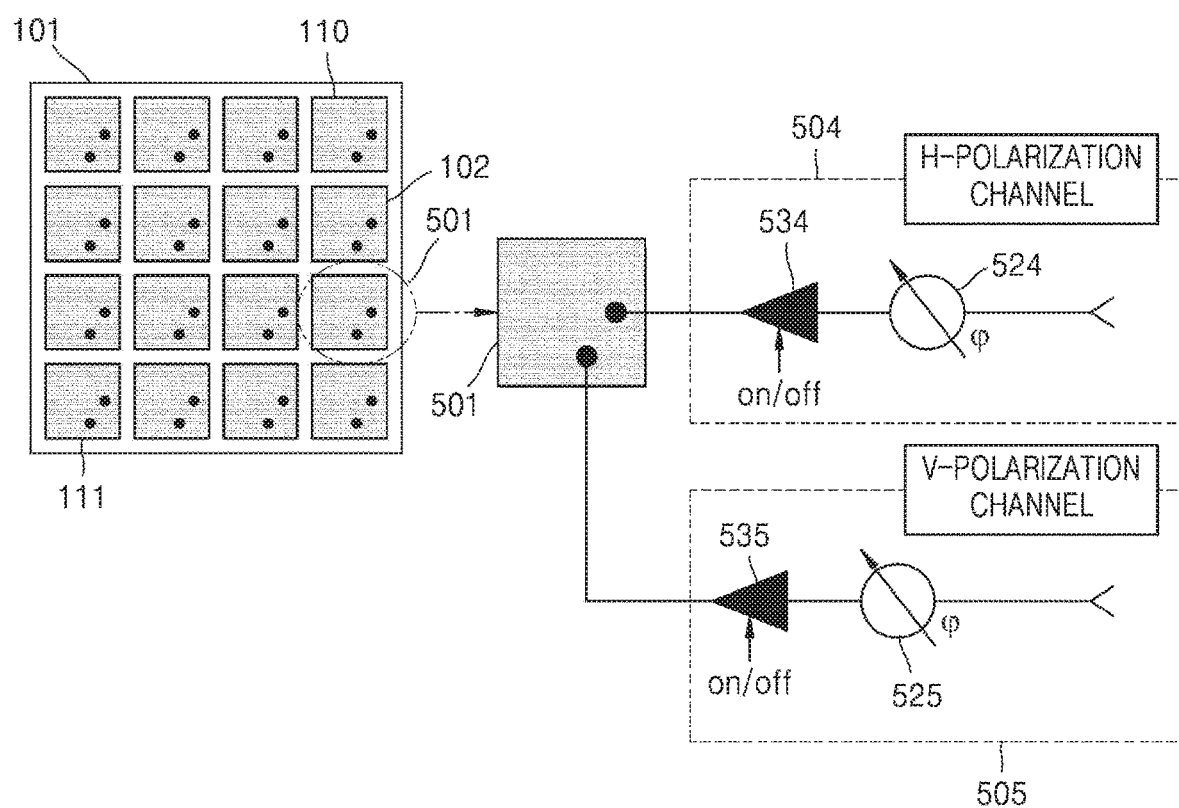
FIG. 5 is a view for describing a method of adjusting a phase of a polarization channel of an antenna array according to another embodiment.

FIG. 5 is a view for describing a method of adjusting a phase of a polarization channel of an antenna array according to another embodiment.

An antenna array 501 illustrated in FIG. 5 may be another antenna array, a phase of which is adjusted after a phase of the reference antenna array 102 is set, and may not be the reference antenna array 102. Hereinafter, an embodiment in which, after the phase of the reference antenna array 102 is set, another antenna array is set will be described. As described above, when the phase of the reference antenna array 102 is determined, other antenna arrays may maintain a disabled state.

According to an embodiment, the antenna array 501 may include two separate channels, namely, an H-polarization channel 504 and a V-polarization channel 505. According to an embodiment, the H-polarization channel 504 may include a phase converter 524 and a fixed gain amplifier 534 which may be turned on/off, and the V-polarization channel 505 may include a phase converter 525 and a fixed gain amplifier 535 which may be turned on/off. According to an embodiment, the H-polarization channel 504 and the V-polarization channel 505 may be enabled to generate a power signal or disabled not to generate a power signal.

According to an embodiment, the wireless power transmitter 100 may activate the antenna array 501 together with the reference antenna array 102, after an optimum phase of the reference antenna array 102 is determined. Here, the V-polarization channel 503(b), which is one of the two polarizations channels of the antenna array 501, may be activated, and the H-polarization channel 504 may be deactivated. Thereafter, a power signal may be transmitted to a wireless power receiver from the antenna array 501 by using only the V-polarization channel 505. According to an embodiment, the wireless power transmitter 100 may determine a phase of the V-polarization channel 505, at which power received by the wireless power receiver has a maximum value, by using the reference antenna array 102 and the antenna array 501. Thereafter, the wireless power transmitter 100 may activate the H-polarization channel 504 while maintaining the V-polarization channel 505 as an enabled state. The wireless power transmitter 100 may determine a phase of the H-polarization channel 504, at which the wireless power receiver receives power of a maximum value.

Also, the wireless power transmitter 100 may determine phases of remaining antenna arrays of the wireless power transmitter 100 by using the same method.

Alternatively, phases of the both polarization channels of the antenna array 501 may be simultaneously adjusted. After phases of all antenna arrays of the wireless power transmitter 100 are determined, a complex amplitude Ai at each antenna array may be obtained by using Equation 4 below.

$$\arg(A_i^{V,H}) = \arg\left(\sum_{k=1}^{N_{RX}} \exp(j\varphi_{ik}^{V,H})\right), mag(A_i^{V,H}) = 1 \quad \text{Equation 4}$$

Here, arg may be an operator for determining a phase of a complex number and may be an operator for determining a modulus of the complex number. Consequently, power outputs of the antenna arrays included in the wireless power transmitter 100 may be the same and all of the polarization channels may have phases adjusted such that the receiver receives maximum power.

Also, the optimum transmission phase values of the polarization channels of the antenna arrays included in the wireless power transmitter 100 may be stored in a memory of the wireless power transmitter 100.

Figure 6:
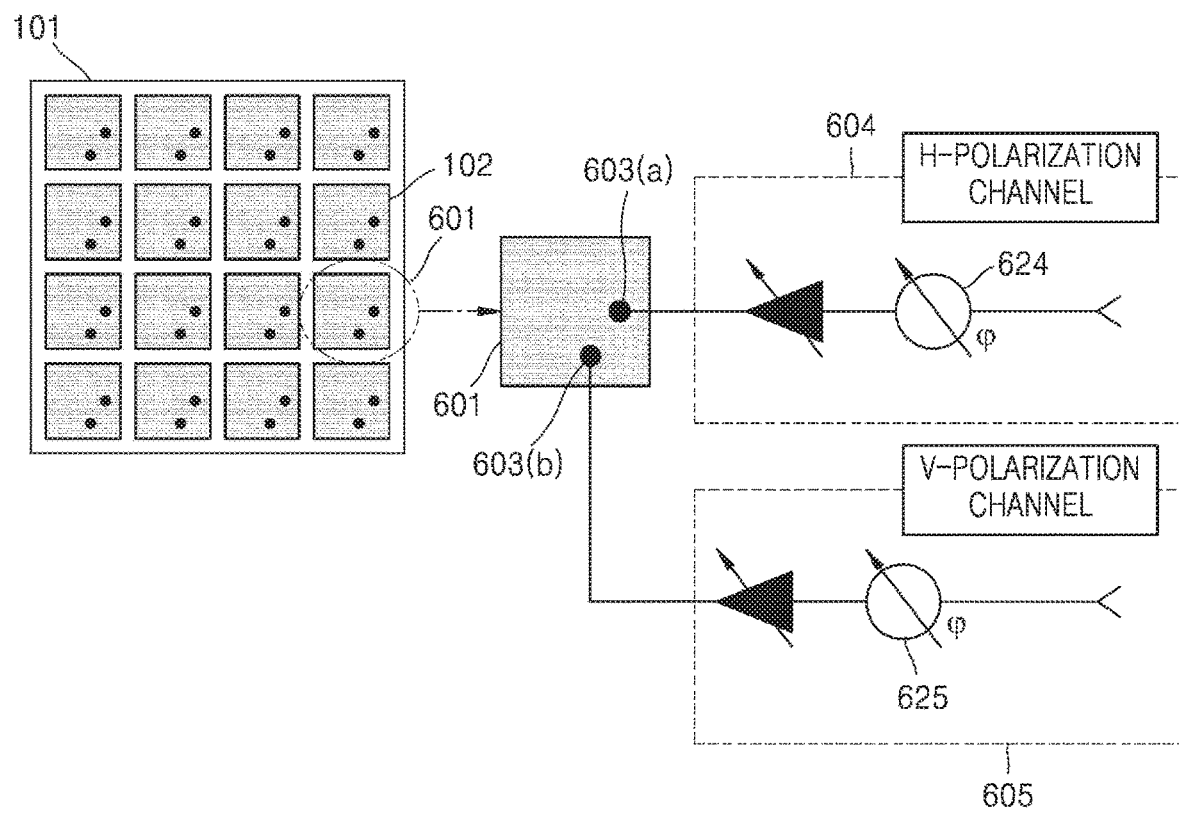
FIG. 6 is a view for describing a structure of an antenna array according to another embodiment.

FIG. 6 is a view for describing a structure of an antenna array according to another embodiment.

According to an embodiment, circular polarization may refer to electro waves, a plane of the electro waves being perpendicular to a direction of the electro waves, wherein a trace of an end of vector indicating a size and a direction of an electric field forms a circular shape at the plane. When the electric field vector of the plane forming a right angle with respect to the direction of the electro waves rotates in a clockwise direction toward the direction of the electro waves, the circular polarization may be referred to as right hand circular polarization (RHCP) and when the same rotates in an anti-clockwise direction, the circular polarization may be referred to as left hand circular polarization (LHCP).

The antenna array 601 illustrated in FIG. 6 may include two separate channels, namely, an RHCP-polarization channel 604 connected to an RHCP-polarization feeding point 603 (*a*) and an LHCP-polarization channel 605 connected to an LHCP-polarization feeding point 603 (*b*).

According to an embodiment, the RHCP-polarization channel 604 may include an RHCP-polarization phase converter 624 and an RHCP-polarization control amplifier 634. Also, the LHCP-polarization channel 605 may include an LHCP-polarization phase converter 625 and an LHCP-polarization control amplifier 635.

According to an embodiment, the RHCP-polarization channel 604 and the LHCP-polarization channel 605 may be enabled to separately generate power signals or may be disabled not to generate power signals.

A method of adjusting phases of the polarization channels of the antenna array 601 illustrated in FIG. 6 may be the same as the method of adjusting the phases of the antenna array 501 described in FIG. 5.

According to an embodiment, after phases of the antenna array 601 and other antenna arrays included in the antenna portion 101 of FIG. 6 are determined, the antenna portion 101 may generate and transmit power signals by using the determined phases of the antenna arrays.

Figure 7:
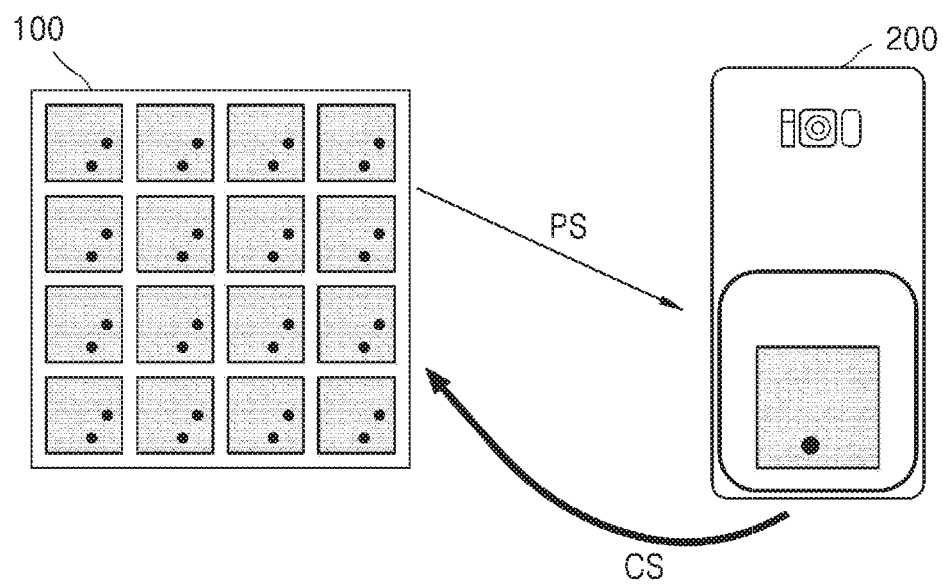
FIG. 7 is a view for describing a wireless power system in a case in which there is no obstacle, according to an embodiment.

FIG. 7 is a view for describing a wireless power system in a case in which there is no obstacle, according to an embodiment.

Hereinafter, embodiments in which the wireless power transmitter 100 and the wireless power receiver 200 transmit and receive power wirelessly will be described with reference to FIGS. 7 through 11. Although the drawings illustrate only a plurality of antenna arrays of the wireless power transmitter 100, it will be understood that the wireless power transmitter 100 may include other components.

According to an embodiment, the wireless power receiver 200 may include an RHCP rectenna. Here, polarization channels of all antenna arrays included in the wireless power transmitter 100 may be excited to the same amplitude and a phase of 90°. Thus, the wireless power transmitter 100 may generate pure RHCP.

The wireless power receiver 200 may transmit a communication signal CS to the wireless power transmitter 100, thereby transmitting information about a power signal PS received by the wireless power receiver 200. Accordingly, the wireless power transmitter 100 may adjust a relative phase of the antenna arrays such that maximum power is transmitted to the wireless power receiver 200.

Figure 8:
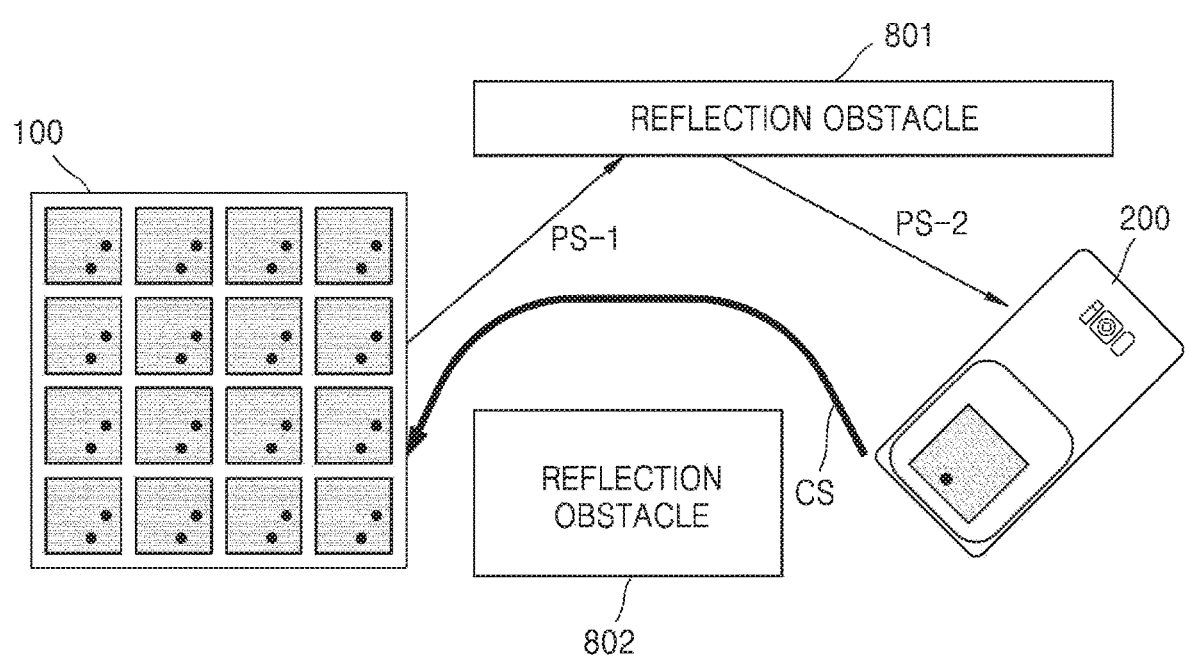
FIG. 8 is a view for describing a method of transmitting wireless power in a case in which there is a reflection obstacle, according to an embodiment.

FIG. 8 is a view for describing a wireless power transmission method in a case in which there is a reflection obstacle, according to an embodiment.

Reflection obstacles 801 and 802 according to an embodiment may include a dielectric and a material having substantially different magnetic characteristics from air.

According to an embodiment, a power signal radiated from the wireless power transmitter 100 may be transmitted to the wireless power receiver 200 through a single reflection, by bumping into the reflection obstacles 801 and 802.

According to an embodiment, the wireless power receiver 200 may include an RHCP rectenna. Here, when an RHCP signal PS-1 is radiated from the wireless power transmitter 100, the RHCP signal PS-1 may be reflected from the reflection obstacles 801 and 802 and may be changed into an LHCP signal PS-2. In this case, the wireless power receiver 200 may not be able to receive the LHCP signal PS-2, and thus, may not be able to receive a power signal from the wireless power transmitter 100.

According to an embodiment, the wireless power transmitter 100 may receive, from the wireless power receiver 200, a communication signal CS including information about power received by the wireless power receiver 200 and may adjust, based on the information included in the communication signal CS, a relative phase between polarization channels of the plurality of antenna arrays included in the wireless power transmitter 100. Here, deviation of the relative phase between the polarization channels may be changed between +90° and −90°.

Accordingly, the wireless power transmitter 100 may determine a phase at which the wireless power receiver 200 may receive maximum power and may use the phase adaptively determined according to a situation, in order to efficiently transmit power.

Figure 9:
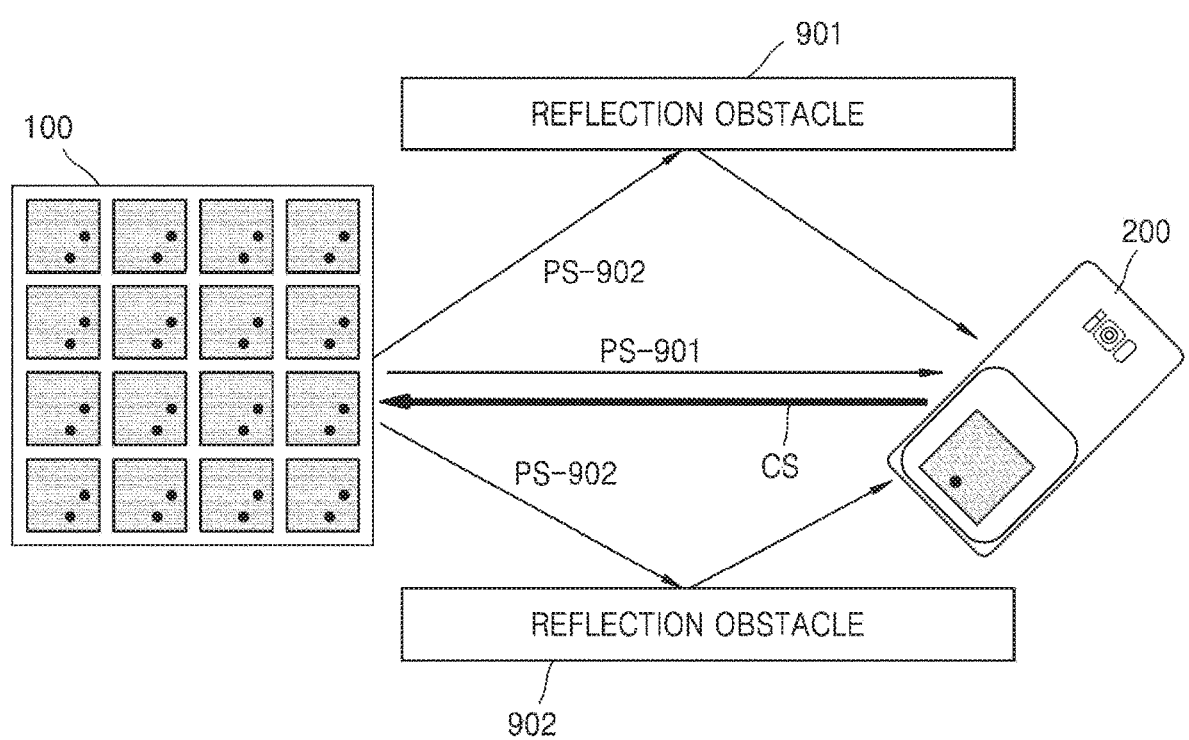
FIG. 9 is a view for describing a wireless power transmission method in a case in which direct transmission of a power signal and reflected transmission of a power signal are simultaneously performed, according to an embodiment.

FIG. 9 is a view for describing a wireless power transmission method in a case in which direct transmission of a power signal and reflected transmission of a power signal are simultaneously performed, according to an embodiment.

According to an embodiment, the wireless power transmitter 100 may directly transmit a power signal PS-901 to the wireless power receiver 200 or may transmit a power signal PS-902 reflected from reflection obstacles 901 and 902. Here, the wireless power transmitter 100 may automatically adjust phases of polarization channels of antenna arrays such that the phases are combined at a location at which the wireless power receiver 200 is located. Accordingly, the efficiency of power transmission may be maximized.

Figure 10:
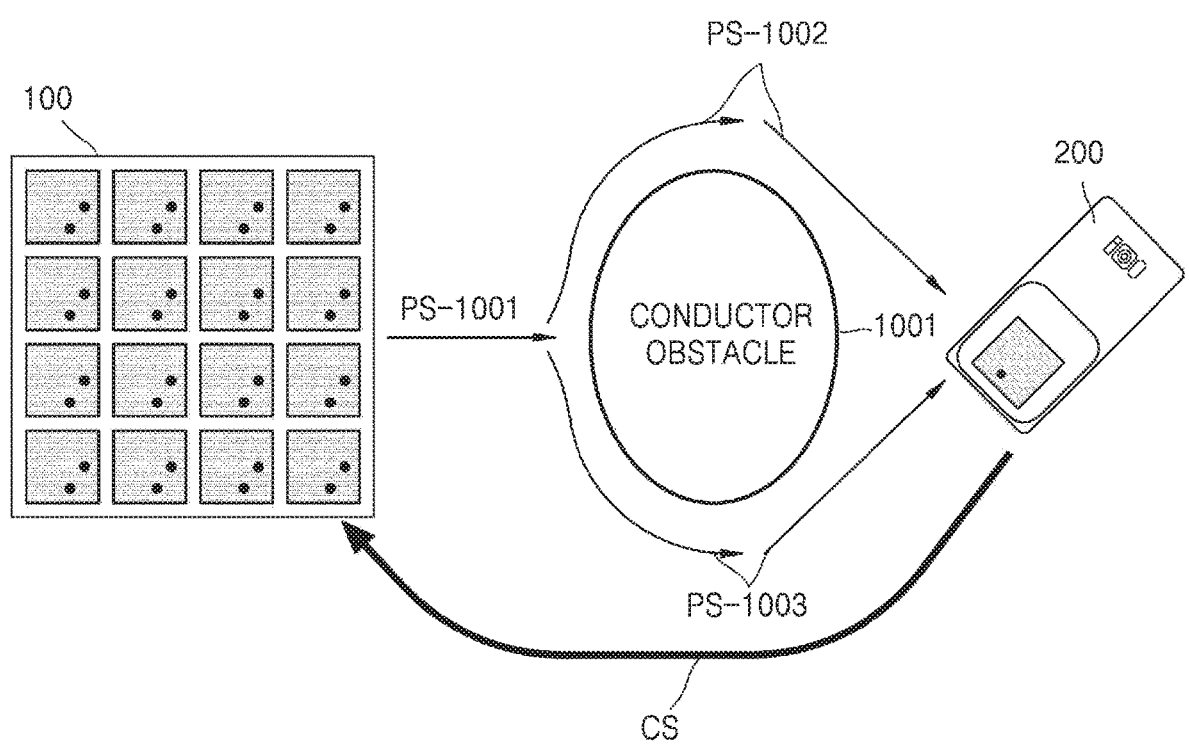
FIG. 10 is a view for describing a wireless power transmission method in a case in which there is a conductor obstacle between a wireless power transmitter and a wireless power receiver, according to an embodiment.

FIG. 10 is a view for describing a wireless power transmission method in a case in which there is a conductor obstacle between a wireless power transmitter and a wireless power receiver, according to an embodiment.

When there is a conductor obstacle 1001 between the wireless power transmitter 100 and the wireless power receiver 200, a radiated power signal PS-1001 may be diffracted at the conductor obstacle 1001.

By analyzing a communication signal CS received from the wireless power receiver 200, the wireless power transmitter 100 may automatically adjust phases of polarization channels of antenna arrays such that the phases of diffracted power signals PS-1002 and PS-1003 are combined at a location at which the wireless power receiver 200 is located. Accordingly, the wireless power transmitter 100 may transmit the power signal to the wireless power receiver 200 with the maximum efficiency.

Figure 11:
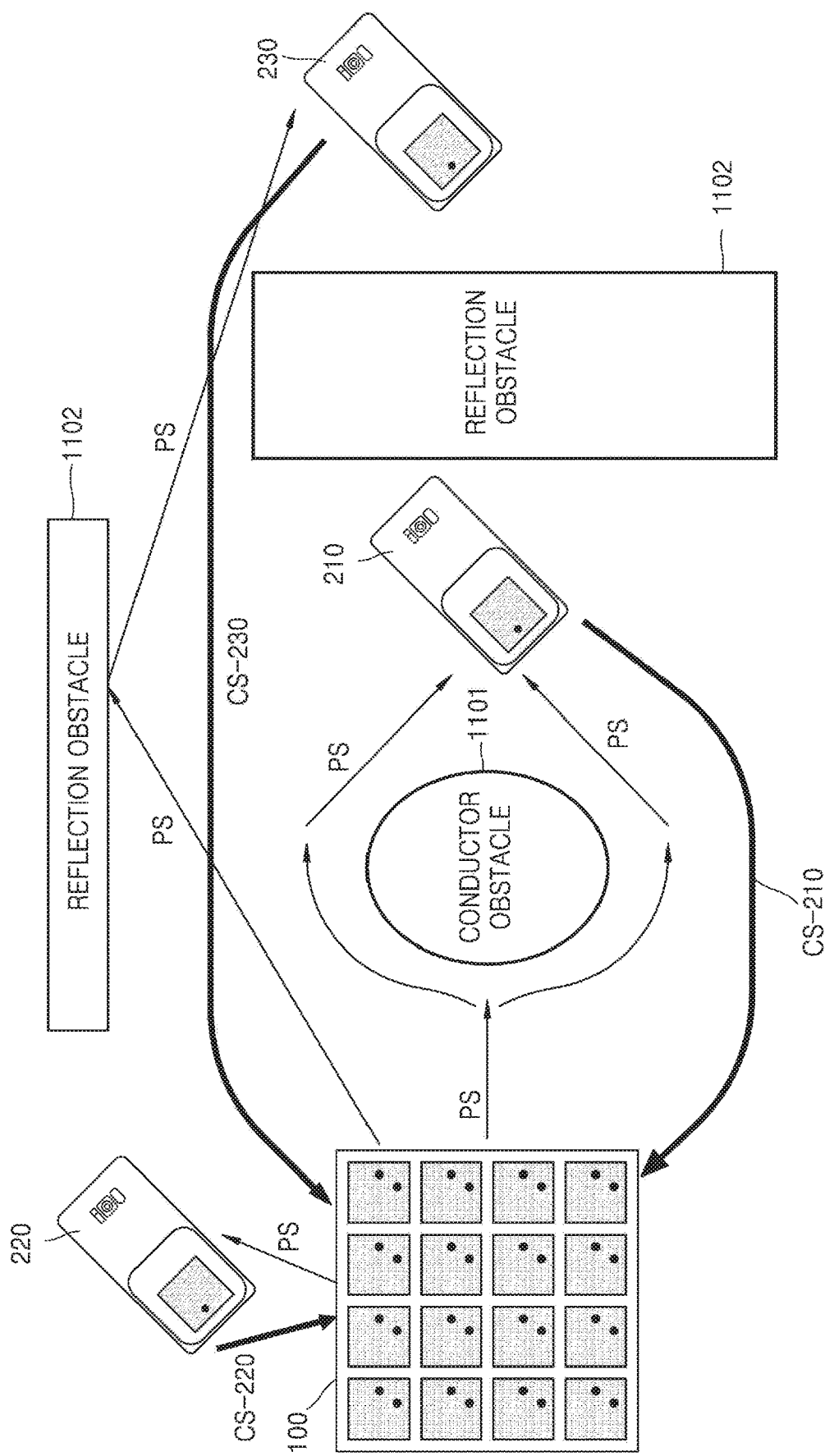
FIG. 11 is a view for describing a method of wirelessly transmitting a power signal in a situation in which there are a plurality of obstacles and a plurality of wireless power receivers, according to an embodiment.

FIG. 11 is a view for describing a method of wirelessly transmitting a power signal in a situation in which there are a plurality of obstacles and a plurality of wireless power receivers, according to an embodiment.

According to an embodiment, the wireless power transmitter 100 may simultaneously transmit power signals to a plurality of wireless power receivers 210, 220, and 230. According to an embodiment, the plurality of wireless power receivers 210, 220, and 230 may be located at different locations from one another. For example, the first wireless power receiver 210 may be located behind a conductor obstacle 1101, the second wireless power receiver 220 may be located to be adjacent to the wireless power transmitter 100 without an obstacle therebetween, and the third wireless power receiver 230 may be located at a location hidden by a reflection obstacle 1102.

The wireless power transmitter 100 may receive a plurality of communication signals CS-210, CS-220, and CS-230 from the plurality of wireless power receivers 210, 220, and 230 and may adjust, based on the plurality of communication signals CS-210, CS-220, and CS-230, phases of polarization channels of antenna arrays. Here, processes of adjusting the phases of the polarization channels of the antenna arrays may be simultaneously performed or may be sequentially performed with respect to the plurality of wireless power receivers 210, 220, and 230. As a result, the wireless power transmitter 100 may transmit, with high efficiency, the power signal CS to each of the plurality of wireless power receivers 210, 220, and 230.

Also, according to the plurality of communication signals CS-210, CS-220, and CS-230 received from the plurality of wireless power receivers 210, 220, and 230, when any one of the plurality of wireless power receivers 210, 220, and 230 is completely charged, the transmission of the power signal to the wireless power receiver completely charged may be stopped.

Example embodiments with respect to the wireless power transmitter and the wireless power receiver using the phase amplitude control algorithm are described and illustrated in the accompanying drawings for helping understand the disclosure. However, the embodiments are only examples and should not be construed as limiting the disclosure. Also, the disclosure is not limited to the illustrations and the descriptions. Various modifications may be made by one of ordinary skill in the art.

A computer system and a memory error detection method performed in the computer system described in this specification may be realized by a hardware component, a software component, and/or a combination of a hardware component and a software component.

Software may include a computer program, a code, an instruction, or a combination of one or more of the computer program, the code, and the instruction, and may organize processors to operate as desired or command the processors separately or collectively.

Software may include a computer program including instructions stored in a computer-readable storage media. Examples of computer-readable recording media may include magnetic storage media (for example, read-only memory (ROM), random-access memory (RAM), floppy disks, hard disks, etc.), optical reading media (for example, CD-ROM, a digital versatile disc (DVD), etc.), etc. The computer-readable recording media may be distributed in computer systems connected in networks and computer-readable codes may be stored and executed in a distributed fashion. Media may be stored in a memory and executed by a processor.

The computer-readable storage media may include non-transitory storage media. Here, the term "non-transitory" only denotes that storage media do not include a signal and are tangible, and may not distinguish half-permanent storage of data in the storage media and temporary storage of data in the storage media.

Also, the computer system and the method of detecting the memory error in the computer system according to the embodiments described in this specification may be provided by being included in a computer program product. The computer program product may be purchasable as a product between a seller and a purchaser.

The computer program product may include a software program and a computer-readable storage medium in which the software program is stored. For example, the computer program product may include a software program-type product (for example, a downloadable application) electronically distributed by a manufacturer of an electronic device or electronic markets (for example, Google Play™ store, App Store, etc.). For electronic distribution, at least a portion of the software program may be stored in storage media or temporarily generated. In this case, the storage media may be a server of the manufacturer, a server of the electronic market, or a storage medium of a broadcasting server temporarily storing the software program.

The computer program product may include a storage medium of a server or a storage medium of a terminal in a system including the server and the terminal (for example, an ultrasonic diagnosis apparatus). Alternatively, when there is a third device (for example, a smartphone) connected with the server or the terminal for communication, the computer program product may include a storage medium of the third device. Alternatively, the computer program product may include a software program transmitted to the terminal or the third device from the server or to the terminal from the third device.

In this case, one of the server, the terminal, and the third device may execute the method according to the embodiments by executing the computer program product. Alternatively, at least two of the server, the terminal, and the third device may execute the method according to the embodiments in a distributed fashion by executing the computer program product.

For example, the server (for example, a cloud server or an AI server) may execute the computer program product stored in the server and control the terminal connected with the server for communication to perform the method according to the embodiments.

As another example, the third device may execute the computer program product and control the terminal connected to the third device for communication to perform the method according to the embodiments.

When the third device executes the computer program product, the third device may download a computer program product from the server and execute the downloaded computer program product. Alternatively, the third device may execute the computer program product provided in a free-loaded state and perform the method according to the embodiments.

Although the embodiments have been described by the limited embodiments and the drawings as described above, various modifications and variations are possible by one of ordinary skill in the art from the above description. For example, the described techniques may be performed in a different order than the described method, and/or components of the described electronic device, structure, circuit, etc. may be combined or integrated in a different form than the described method, or may be replaced or substituted by other components or equivalents to achieve appropriate results.

The invention claimed is:

1. A wireless power transmission method comprising:
receiving a communication signal from a wireless power receiver;
determining, based on the communication signal, phases of polarization channels of a reference antenna array, at which the wireless power receiver receives maximum power;
determining, by activating a first antenna array together with the reference antenna array, phases of polarization channels of the first antenna array such that the wireless power receiver receives maximum power;
determining, by deactivating the first antenna array and activating a second antenna array together with the reference antenna array, phases of polarization channels of the second antenna array such that the wireless power receiver receives maximum power; and
transmitting, to the wireless power receiver, a power signal generated by using the reference antenna array, the first antenna array, and the second antenna array, wherein the determining of the phases of the polarization channels of the first antenna array comprises:
  determining, in a state in which only a first polarization channel of two polarization channels of the first antenna array is activated, a first phase of the first polarization channel, at which the wireless power receiver receives maximum power; and
  after determining the first phase, determining, by activating a second polarization channel, a second phase of the second polarization channel, at which the wireless power receiver receives maximum power.

2. The wireless power transmission method of claim 1, wherein the determining of the phases of the polarization channels of the reference antenna array comprises:
  transmitting a variable power signal by adjusting a relative phase of two polarization channels included in the reference antenna array;
  receiving, from the wireless power receiver receiving the variable power signal, the communication signal including information about power received by the wireless power receiver; and
  determining the phases of the two polarization channels, based on the communication signal.

3. The wireless power transmission method of claim 1, wherein the polarization channels of the reference antenna array comprise a horizontal linear polarization channel and a vertical linear polarization channel.

4. The wireless power transmission method of claim 1, wherein the polarization channels of the reference antenna array comprise a right hand circular polarization channel and a left hand circular polarization channel.

5. The wireless power transmission method of claim 1, further comprising:
  sequentially determining phases of polarization channels of all antenna arrays included in a wireless power transmitter;
  calculating a complex amplitude of the polarization channels of each of all the antenna arrays, by using the determined phases of the polarization channels of all the antenna arrays; and
  generating, according to the calculated complex amplitude, a wireless power signal with respect to the wireless power receiver.

6. The wireless power transmission method of claim 1, further comprising:
  receiving a plurality of communication signals from a plurality of wireless power receivers;
  determining phases of polarization channels of antenna arrays with respect to each of the plurality of wireless power receivers;
  generating a plurality of power signals by using the determined phases of the polarization channels of the antenna arrays; and
  transmitting the power signals to the plurality of wireless power receivers, respectively.

7. The wireless power transmission method of claim 6, wherein the determining of the phases of the polarization channels of the antenna arrays with respect to each of the plurality of wireless power receivers is sequentially or simultaneously performed with respect to the plurality of wireless power receivers.

8. The wireless power transmission method of claim 1, wherein the communication signal comprises at least one of a magnitude of power received by the wireless power receiver, a charge rate of the wireless power receiver, a location of the wireless power receiver, or a state of the wireless power receiver.

9. The wireless power transmission method of claim 1, wherein each of the polarization channels of the reference antenna array comprises a phase converter and a power control amplifier.

10. The wireless power transmission method of claim 1, wherein each of the polarization channels of the reference antenna array comprises a phase converter and a fixed gain amplifier.

11. The wireless power transmission method of claim 1, wherein the wireless power receiver comprises an antenna having one polarization channel and the polarization channel is connected to a rectifier to form a rectenna.

12. The wireless power transmission method of claim 1, wherein the wireless power receiver comprises an antenna having two polarization channels and the two polarization channels being coupled to a first rectifier and a second rectifier, respectively, wherein output values of the first and second rectifiers are combined in a common direct current (DC) load.

13. A wireless power transmitter comprising:
  an antenna portion comprising a plurality of antenna arrays comprising two separate polarization channels for transmitting a wireless power signal;
  a processor; and
  a memory,
  wherein the processor is configured to:
    determine, after receiving a communication signal from a wireless power receiver, phases of polarization channels of a reference antenna array, at which the wireless power receiver receives maximum power, based on the communication signal;
    determine, by activating a first antenna array together with the reference antenna array, phases of polarization channels of the first antenna array such that the wireless power receiver receives maximum power;
    determine, by deactivating the first antenna array and activating a second antenna array together with the reference antenna array, phases of polarization channels of the second antenna array such that the wireless power receiver receives maximum power; and
    transmit, to the wireless power receiver, a power signal generated by using the reference antenna array, the first antenna array, and the second antenna array, and
  wherein the processor is further configured to:
    determine, in a state in which only a first polarization channel of two polarization channels of the first antenna array is activated, a first phase of the first polarization channel, at which the wireless power receiver receives maximum power; and
    after determining the first phase, determine, by activating a second polarization channel, a second phase of the second polarization channel, at which the wireless power receiver receives maximum power.

14. A computer program product comprising a non-transitory recording medium storing a computer program to:
  determine, after receiving a communication signal from a wireless power receiver, phases of polarization channels of a reference antenna array, at which the wireless power receiver receives maximum power, based on the communication signal;
  determine, by activating a first antenna array together with the reference antenna array, phases of polarization channels of the first antenna array such that the wireless power receiver receives maximum power;
  determine, by deactivating the first antenna array and activating a second antenna array together with the reference antenna array, phases of polarization channels of the second antenna array such that the wireless power receiver receives maximum power;

transmit, to the wireless power receiver, a power signal generated by using the reference antenna array, the first antenna array, and the second antenna array;

determine, in a state in which only a first polarization channel of two polarization channels of the first antenna array is activated, a first phase of the first polarization channel, at which the wireless power receiver receives maximum power; and after determining the first phase, determine, by activating a second polarization channel, a second phase of the second polarization channel, at which the wireless power receiver receives maximum power.

* * * * *